United States Patent
Kautzky

Patent Number: 5,929,334
Date of Patent: Jul. 27, 1999

[54] ULTRASENSITIVE BALANCING DEVICE FOR AUTOMOTIVE WHEELS

[76] Inventor: Hans Kautzky, 284 Church St., West Chicago, Ill. 60185-2706

[21] Appl. No.: 09/069,905

[22] Filed: Apr. 30, 1998

[51] Int. Cl.$^6$ .................................................. G01M 1/00
[52] U.S. Cl. .......................................... 73/486; 73/483
[58] Field of Search ........................ 73/486, 485, 484, 73/483, 482, 487, 66

[56] References Cited

U.S. PATENT DOCUMENTS

| | | | |
|---|---|---|---|
| D. 141,990 | 8/1945 | Butler | 73/486 |
| 2,270,657 | 1/1942 | Kraft | 73/485 |
| 2,421,215 | 5/1947 | Olbrys | 73/66 |
| 2,481,256 | 9/1949 | Sutton | 73/486 |
| 2,506,002 | 5/1950 | Tinkham | 73/66 |
| 2,512,231 | 6/1950 | Hart | 73/486 |
| 2,698,537 | 1/1955 | Taylor et al. | 73/66 |
| 2,898,764 | 8/1959 | Kinsey et al. | 73/66 |
| 2,919,582 | 1/1960 | Reidel | 73/66 |
| 3,036,468 | 5/1962 | Anderson | 73/66 |
| 3,045,497 | 7/1962 | Lackie | 73/486 |
| 3,122,021 | 2/1964 | Karig | 73/485 |
| 3,148,546 | 9/1964 | Karig | 73/486 |
| 3,365,954 | 1/1968 | Levino | 73/486 |
| 3,452,605 | 7/1969 | Markley | 73/486 |
| 3,620,086 | 11/1971 | Jogerst | 73/483 |
| 3,757,588 | 9/1973 | Bateman | 73/483 |
| 3,777,575 | 12/1973 | Smithmeyer | 73/483 |
| 3,864,980 | 2/1975 | Barnes | 73/484 |
| 3,919,889 | 11/1975 | Mitchell | 73/485 |
| 3,992,950 | 11/1976 | Pflieger | 73/486 |
| 4,011,762 | 3/1977 | Kubik | 73/484 |
| 4,043,218 | 8/1977 | Groeper | 73/486 |
| 4,051,733 | 10/1977 | Tomkin | 73/484 |
| 4,237,735 | 12/1980 | Rodgers et al. | 73/486 |
| 4,448,073 | 5/1984 | Patry | 73/484 |
| 4,924,705 | 5/1990 | Stanley | 73/484 |

*Primary Examiner*—Hezron Williams
*Attorney, Agent, or Firm*—Milles & Milles S.C.

[57] ABSTRACT

A balancing device for a wheel and tire assembly has an elongate cylinder with an upper end, a lower end, an exterior surface and male threads formed on the exterior surface. A longitudinal cylinder bore extends axially through the cylinder and receives therethrough a suspension cord. The cord has a stop element at a support end extending beyond the lower end of the cylinder for supporting the cylinder. A support member has a wheel support flange and at least a first wheel hub centering section extending from the support flange. The centering section has a fixed diameter adapted to accommodate a particular diameter wheel hub opening of the wheel and tire assembly. An axial bore is formed through the support member and has female threads formed internally in the bore which correspond to the male threads of the cylinder. The support member is received over the cylinder and is movable between the upper and lower ends of the cylinder in order to precisely locate the center of gravity of the wheel and tire assembly allowing a precise balancing of the assembly.

11 Claims, 1 Drawing Sheet

ULTRASENSITIVE BALANCING DEVICE FOR AUTOMOTIVE WHEELS

BACKGROUND OF THE INVENTION

This invention relates generally to wheel and tire assemblies for automobiles and the like, and more particularly to a balancing device which is highly sensitive and accurate and yet simple in construction.

There are many known methods and devices for balancing wheel and tire assemblies. Each of these devices is adapted to locate the out of balance condition of the wheel and tire assembly by finding the heaviest section around the circumference of the assembly. Typically, a weight is added to the assembly at the lightest point in order to counter-balance the condition. Some of these known devices and methods incorporate suspending the wheel and tire assembly at the center hub to support the wheel at the hub on a support member. Various suspension methods and devices are known as well as various supporting devices.

For example, U.S. Pat. No. 3,045,497, issued to Lackie, discloses a suspension or pendant wheel balancer having a cord extending through a cylinder. The cord suspends the cylinder in a fixed relation and the cylinder has a flange for supporting the tire and wheel assembly. A slip ring having a tapered external surface is used which slips over the cylinder and into the wheel hub opening for attempting to center the wheel relative to the cylinder. Use of such a tapered wedge design is known in the art for use as a centering device for a wheel balancer. However, it is also known that such a device is not highly accurate in centering the wheel because the wedge itself does not always completely level itself relative to the wheel. If the wedge or tapered devices cock sideways and is not level, the wheel will not be centered relative to the cylinder and therefore the balancing process loses accuracy.

U.S. Pat. No. 4,043,218, issued to Groeper, discloses a pendant wheel balancer also using a cord which suspends a support device. This balancer includes a cylinder having external threads for receiving a correspondingly threaded support member. The support member moves upward and downward relative to the cylinder in order to adjust the wheel support surface relative to the pivot between the cylinder and the cable. This device also includes a wheel centering mechanism including three cam elements which are independently adjustable in order to center the wheel. There is no accurate means provided for determining when the wheel is properly centered relative to the cylinder and therefore this device also provides inaccurate wheel balancing.

There are other suspension or a pendant wheel balancers known in the art as well. Each of these known devices typically includes one element either a centering means for accurately centering the wheel relative to a vertical axis or a sensitive element for finding the out of balance portion of the wheel. Some devices also include different types of pivot elements in order to provide a highly sensitive friction-free pivot so that the device may easily and accurately locate the out of balance of the wheel. However, none of these devices includes a means for accurately and precisely balancing a wheel which provides all three of these elements in a highly accurate, durable and inexpensive wheel balancer.

SUMMARY OF THE INVENTION

The present invention is directed to a pendant type wheel balancer which is simple to use, inexpensive to produce both for the professional and the backyard mechanic. One object of the present invention is to provide such a wheel balancer which accurately centers a wheel and tire assembly relative to a vertical axis of the balancer without the need for the user to locate the wheel center. Another object of the present invention is to provide such a wheel balancer which provides a way for adjustably locating the center of gravity of the wheel and the tire assembly in order to locate the out of balance of the wheel and to determine how much weight or counterbalance is required in a highly accurate manner. A further object of the present invention is to provide such a wheel balancer having a friction-free pivot which is also extremely durable.

In order to achieve these and other objects of the present invention, an embodiment of a wheel balancer for a wheel and tire assembly is disclosed. The balancing device has an elongate cylinder with an upper end, a lower end, an exterior surface and male threads formed on the exterior surface. A longitudinal cylinder bore extends axially through the cylinder. A suspension cord extends through the cylinder bore and has a stop element at a support end extending beyond the lower end of the cylinder to support the cylinder thereon. A support member has a wheel support flange for supporting the wheel and tire assembly thereon. At least a first wheel hub centering section extends from the support flange and has a fixed diameter which precisely corresponds to a center hub opening of the wheel. An axial bore is formed through the support member and has female threads formed internally therein which correspond to the male threads of the cylinder. The support member is received over the cylinder and moves between the upper and lower ends.

In an embodiment, the balancing device has a second fixed diameter wheel hub centering section extending from the support flange concentric with the first hub centering section.

In an embodiment, the balancing device also includes a knot formed at the support end of the cord to define the stop element. In another embodiment, a slug is fixed to and carried on the support end of the cord to define the stop element.

In an embodiment, the cylinder bore of the balancing device has a primary diameter larger than a cord diameter of the cord and has a tapered portion adjacent the lower end of the cylinder having a taper diameter which precisely corresponds to the cord diameter.

In an embodiment, the suspension cord is a steel cord of a wound wire construction.

In an embodiment, the support member is machined from a steel material or an aluminum material. In another embodiment, the cylinder is machine from a steel material or an aluminum material.

In an embodiment, the wheel support flange is a circular flange extending radially outward from the axial bore and is concentric to the first wheel hub centering section which extends upward from the wheel support flange. In another embodiment, a second fixed diameter wheel hub centering section extends upward from the first hub centering section and has a smaller fixed diameter than that of the first centering section.

These and other objects, features and advantages of the present invention are described herein, and will become apparent from the detail description of the presently preferred embodiments and related drawing figures.

DETAILED DESCRIPTION OF THE PRESENTLY PREFERRED EMBODIMENTS

Figure 1:
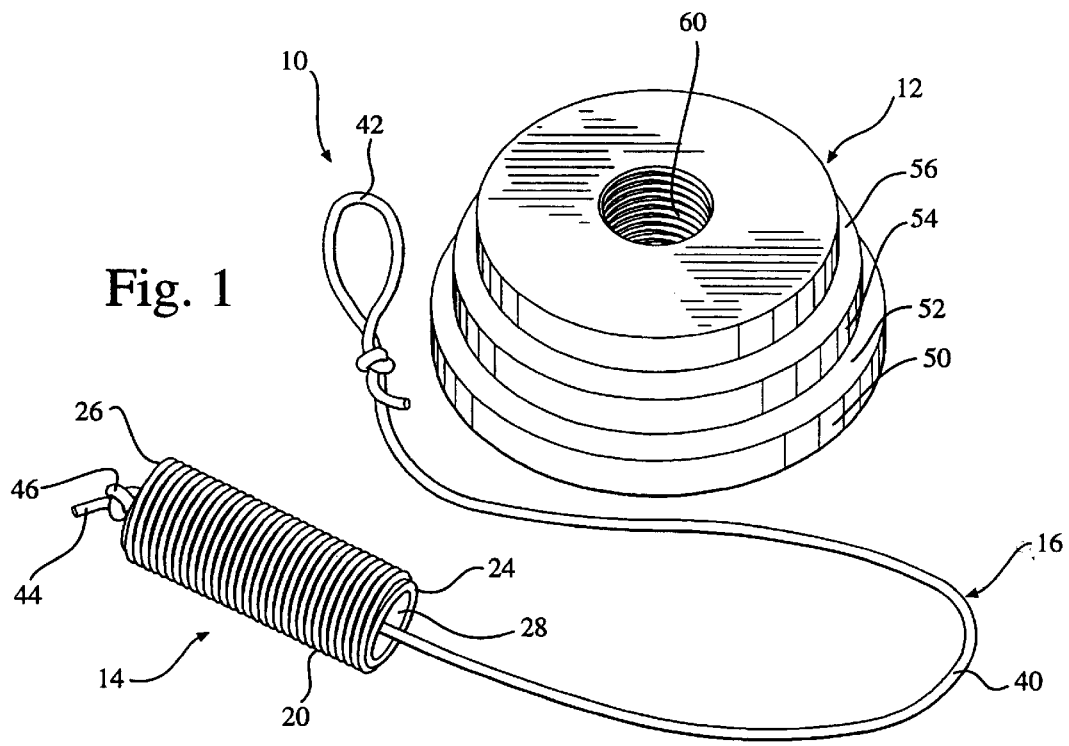
FIG. 1 illustrates a perspective view of a balancing device constructed in accordance with an embodiment of the present invention including both a wheel support member and a support cylinder and suspension cord assembly.

FIG. 1 illustrates a balancing device 10 which includes a support member 12, an elongate cylinder 14, and a suspension cord 16. In general, the balancing device 10 supports a wheel and tire assembly 18 thereon as illustrated in FIG. 2 for precisely balancing the assembly.

The cylinder 14 includes an exterior threaded surface 20 having a plurality of male threads 22 formed thereon. The cylinder 14 is preferably an elongate circular cylinder and has an upper end 24 and a lower end 26. The cylinder also has a longitudinal cylinder bore 28 formed axially therethrough extending from the upper end 24 to the lower end 26. The cylinder bore 28 has a primary diameter which is somewhat larger than the diameter of the suspension cord 16 over most of its length. In a preferred embodiment, the cylinder bore has a tapered section 30 which tapers down to a taper diameter 32 adjacent the lower end 26 of the cylinder. This taper diameter 32 is intended to precisely fit or correspond to the suspension cord 16 as illustrated in FIG. 2.

Figure 2:
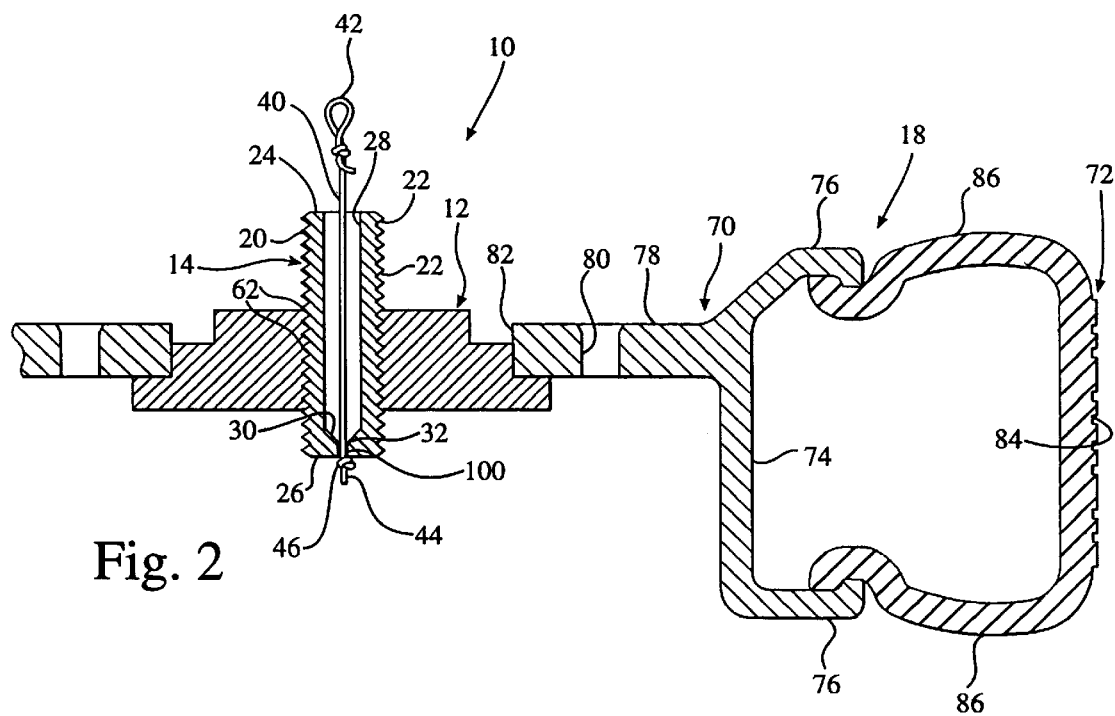
FIG. 2 illustrates a cross section of a portion of a wheel and tire assembly supported on the balancing device of FIG. 1.

The suspension cord 16 includes a main elongate body section 40 which has at its upper end an attachment means 42 illustrated as a loop in FIGS. 1 and 2 for attaching to a suitable support anchor. The attachment means may take on many forms and constructions without departing from the scope of the invention. A support anchor is not illustrated in the present figures but may be any type of hook or support arm attached to a remote supporting device or a ceiling of a garage, or any other type of member which securely holds the balancing device 10 and the weight of a wheel and tire assembly off the ground. The attachment means may be a knot or slug on the end of the cord 16 or may be a formed member such as a hook connected to the cord. The attachment means must merely hold the cord 16 at its upper end to any suitable support anchor.

The suspension cord 16 also includes a support end 44 having a stop element 46 formed thereon. In the present embodiment, the stop element 46 is illustrated as a knot in the cord 16 which has a larger diameter than the tapered diameter 32 in order that the cylinder 14 is prevented from passing over the support end 44 of the cord 16. The stop element 46 may take on other forms and constructions without departing from the scope of the present invention. The stop element 46 may include a type of slug which is either welded, sweged, or otherwise affix to the support end 44 of the cord 16. The stop element 46 is intended to merely support the weight of the support member 12, the cylinder 14 and a wheel and tire assembly 18 when suspended from a suitable support anchor. The stop element 46 does not by itself provide the pivoting function of the balancing device. This feature is described in more detail below.

The support member 12 of the present embodiment includes an annular wheel support flange 50 having an upper support surface 52 intended to contact and support a wheel and tire assembly as is described in more detail below. In the present embodiment, the support flange 50 is in the form of a circular cylindrical disk extending radially outward from a first wheel hub centering section 54 having a fixed diameter smaller than the diameter of the support flange 50. The centering section 54 extends upward from the support flange 50. In the present embodiment, the support member 12 also includes a second wheel hub centering section 56 extending upward from the first wheel hub centering section 54. The second section 56 has a smaller diameter than the first section 54 and is intended to accommodate a wheel of different size than the first section 54 as is described below.

The support member 12 of the present invention also includes an axial bore 60 formed therethrough and concentric with the axis of the support flange 50 and the first and second wheel hub centering sections 54 and 56. The axial bore 60 extends through the support member 12 and includes a plurality of female threads 62 formed on the interior surface of the bore which corresponds to the exterior male threads 22 of the cylinder 14. As illustrated in FIG. 2, the support member 12 is received over the exterior surface 20 of the cylinder 14 so that the threads 62 and 22 mechanically engage one another for adjustable movement of the support member 12 relative to the cylinder 14 between the upper end 24 and the lower end 26.

In the present embodiment, the support member 12, cylinder 14 and cord 16 may be constructed from various materials without departing from the scope of the present invention. For example, the suspension cord 16 may be in the form of a rope of suitable tensile or in the form of a more durable and higher strength steel wound wire construction. Other constructions may be used as well for the suspension cord without departing from the scope of the invention. Similarly, the support member 12 may be formed of a unitary solid construction and machined to form the support flange 50 and a precise fixed diameter for each of the wheel hub centering sections 54 and 56 as desired. The support member 12 may be constructed from steel, aluminum, suitable alloys, or other known materials of suitable high strength and precise dimensional control characteristics. Similarly, the cylinder may be provided as a machined component from steel, aluminum, suitable alloys, or other such materials as well. It is within the scope of the invention to use high strength plastics and similar compositions as well.

In order to described the function of the balancing device 10, it is necessary to describe the basic components of a wheel and tire assembly 18 as illustrated in FIG. 2. For todays automobiles, trucks and other vehicles, it is common to use wheels constructed from materials other than conventional sheet steel and also to produce the wheels by processes other than conventional stamping. For example, wheels of an aluminum, magnesium, or alloy construction may be cast or forged having configurations which vary greatly from wheel to wheel. However, each assembly 18 in general includes a wheel assembly 70 and a tire assembly 72. The wheel assembly 70 includes a wheel rim 74 having a pair of radially extending rim flanges 76 and a wheel nave 78. The wheel nave 78 includes a plurality of lug mounting openings 80 and a center hub opening 82. The tire assembly 72 includes a tire tread 84 and a pair of tire sidewalls 86.

As illustrated in FIG. 2, one of the wheel hub centering sections 54 or 56 is intended to precisely correspond to the diameter of the wheel hub opening 82. In the present embodiment as illustrated, the first centering section 54 corresponds to the wheel hub opening 82. The wheel support member 12 also includes the second wheel hub centering sections 56, and may therefore accommodate at least two different wheel hub opening sizes. The support member 12 may include only one centering section or include more than two as well. However, each wheel support member 12 precisely centers a given wheel having the wheel hub opening 82 of a specific diameter. Therefore, no adjustment is necessary and thus the device 10 of the invention provides a precisely centered wheel each and every time.

The relative positioning of the wheel nave 78 relative to the wheel rims 74 varies from wheel to wheel depending on the asthetic design of the wheel. Additionally, the size, diameter and weight of various wheel rims and tires varies from assembly to assembly. Therefore, the center of gravity of each wheel and tire assembly 18 is different from the next. The device of the present invention accommodates and locates a support pivot point 100, well above the center of gravity for various wheel and tire assemblies 18.

In order to obtain the desired balancing sensitivity, a user must simply place the wheel and tire assembly on the support surface 52 of the support flange 50 and suspend the device 10 via the attachment end 42 of the cord 16. The individual then must rotate the support member 12 on the cylinder 14 lowering the wheel assembly 18 relative to the pivot point 100 which is defined between the stop element 46 and the bottom end 26 of the cylinder 14. To begin with a coarse sensitivity to find a large imbalance, the pivot point 100 must be well above the center of gravity of the wheel assembly 18. This will show the user where to place one or more counterweights, if needed, to coarsely balance the assembly 18. For example, about one-half inch has been shown to provide an adequate coarse balancing.

Once the wheel and tire assembly 18 is better or coarsely balanced, the user can increase the balancing sensitivity by rotating the support member 12 about the cylinder 14 and moving the pivot point 100 closer to the center of gravity of the assembly 18. The closer the pivot point 100 approaches the center of gravity, the more sensitive the balancing of the wheel becomes approaching an "infinite" sensitivity. Moving the pivot point 100 beyond the center of gravity is impractical because the wheel and tire assembly becomes unstable on the device 10.

The user may continue to repeat the step by step process to approach the theoretically perfect balanced wheel. In practice, two or three steps including the first coarse balancing of the wheel are all that is necessary to produce a superior balanced wheel and tire assembly 18. Producing friction free and accurate centering of the assembly 18, the device 10 outperforms the more sophisticated known devices.

For the above-described balancing process, conventional lead weights are known in the art which simply snap onto the wheel rim 74. A more recently available product uses an adhesive backing on one side of small lead weights which may be adhered, one by one, to the wheel rim 74 in order to balance the assembly 18. The smaller the weight increments utilized to balance the assembly, the more accurate the wheel assembly 18 will be balanced.

The balancing device 10 of the present invention is also highly durable relative to other known wheel balancing devices. This is because the pivot point 100 does not define a friction point between two surfaces. This is accomplished by the tapered diameter 32 directly adjacent the stop element 46 and also by the larger primary diameter of the remainder of the bore 28. The cylinder is permitted to pivot about the pivot point 100 and move laterally at its upper end 24 somewhat because of the space between the cord 16 and the bore 28. There are no surfaces to wear out and no surfaces moving relative to one another. The pivot is therefore essentially friction less and therefore highly accurate.

The balancing device 10 of the present invention is of such a simple design and yet provides highly accurate results that it may be utilized by professional mechanics, gas stations and garages, or by individual backyard mechanic with ease. The device is so simple in construction that it may be sold at conventional auto parts stores for particular types of vehicles. Each vehicle typically has a specific hub size for which the center hub opening 82 correspondingly is precisely sized. Therefore, the balancing device 10 may be offered in a package including the cylinder 14, a cord 16 and a support member 12 which is specifically designed for a particular size wheel hub opening. The user may simply select a packet for their particular vehicle and use it as long as they have the vehicle. Additionally, shops and garages may have on hand just a single cylinder 14 and cord 16 and then have on hand a number of support members 12 which fit all or at least a vast majority of hub sizes.

It should be understood that various changes and modifications to the presently preferred embodiments described herein will be apparent to those skilled in the art. Such changes and modifications may be made without departing from the spirit and scope of the present invention and without dimensioning its attendant advantages. It is, therefore, intended that such changes and modifications be covered by the appended claims.

What is claimed is:

1. A balancing device for a wheel and tire assembly, the wheel having a center hub opening, the balancing device comprising:

an elongate cylinder having an upper end, a lower end, an exterior surface and mechanical threads on the exterior surface;

a longitudinal cylinder bore extending axially through the cylinder;

a suspension cord extending through the cylinder bore, the cord having a stop element at a support end extending beyond the lower end of the cylinder supporting the cylinder thereon;

a support member having a wheel support flange, at least a first wheel hub centering section extending from the support flange and having a fixed hub diameter, an axial bore formed through the support member, and female threads formed internally in the axial bore corresponding to the male threads of the cylinder, the support member received over the cylinder and moveable between the upper and lower ends of the cylinder.

2. The balancing device according to claim 1, further comprising:

a second fixed diameter wheel hub centering section extending from the support flange concentric with the first hub centering section.

3. The balancing device according to claim 1, further comprising: a knot formed at the support end of the cord defining the stop element.

4. The balancing device according to claim 1, further comprising: a slug fixed to and carried on the support end of the cord defining the stop element.

5. The balancing device according to claim 1, wherein the cylinder bore has a bore diameter larger than a cord diameter of the cord and having a tapered portion adjacent the lower end of the cylinder having a taper diameter which precisely fits the cord diameter.

6. The balancing device according to claim 1, wherein the cord is a steel cord of a wound wire construction.

7. The balancing device according to claim 1, wherein the support member is machined from a steel material.

8. The balancing device according to claim 1, wherein the support member is machined from an aluminum material.

9. The balancing device according to claim 1, wherein the cylinder is machined from a steel material.

10. The balancing device according to claim 1, wherein the cylinder is machined from an aluminum material.

11. The balancing device according to claim 1, wherein the support member is of a single material unitary construction.

* * * * *

UNITED STATES PATENT AND TRADEMARK OFFICE
CERTIFICATE OF CORRECTION

PATENT NO. : 5,929,334
DATED : July 27, 1999
INVENTOR(S) : Hans KAUTZKY

It is certified that error appears in the above-identified patent and that said Letters Patent is hereby corrected as shown below:

On the face of the patent, "*Attorney, Agent or Firm*—Milles & Milles, S.C." should read:

-- *Attorney, Agent or Firm*—Nilles & Nilles, S.C. --

Signed and Sealed this

Thirtieth Day of November, 1999

Attest:

Q. TODD DICKINSON

*Attesting Officer*

*Acting Commissioner of Patents and Trademarks*